US010824206B2

(12) United States Patent
Lin

(10) Patent No.: US 10,824,206 B2
(45) Date of Patent: Nov. 3, 2020

(54) ELECTRONIC DEVICE WITH EXTERNAL IMAGE-CAPTURING MODULE

(71) Applicant: Quanta Computer Inc., Taoyuan (TW)

(72) Inventor: Tsung-Te Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 16/598,268

(22) Filed: Oct. 10, 2019

(65) Prior Publication Data

US 2020/0249730 A1 Aug. 6, 2020

(30) Foreign Application Priority Data

Feb. 1, 2019 (TW) .............................. 108103975 A

(51) Int. Cl.
*H05K 7/16* (2006.01)
*G06F 1/16* (2006.01)

(52) U.S. Cl.
CPC .......... *G06F 1/1686* (2013.01); *G06F 1/1616* (2013.01)

(58) Field of Classification Search
CPC ...................................................... H05K 7/00
See application file for complete search history.

(56) References Cited

U.S. PATENT DOCUMENTS

| 7,322,835 | B2 | 1/2008 | Lin et al. |
| 8,823,870 | B2 | 9/2014 | Tsai et al. |
| 9,864,435 | B2 | 1/2018 | Okuley |
| 2017/0308130 | A1* | 10/2017 | Hsu ........................ G06F 1/1643 |

FOREIGN PATENT DOCUMENTS

| CN | 2842523 Y | 11/2006 |
| CN | 103685639 A | 3/2014 |
| CN | 208210018 U | 12/2018 |
| TW | I363554 B | 5/2012 |
| TW | M471613 U | 2/2014 |
| TW | I502314 B | 10/2015 |
| TW | I559119 B | 11/2016 |

OTHER PUBLICATIONS

Chinese language office action dated Nov. 13, 2019, issued in application No. TW 108103975.

* cited by examiner

*Primary Examiner* — Jerry Wu
(74) *Attorney, Agent, or Firm* — McClure, Qualey & Rodack, LLP

(57) ABSTRACT

An electronic device is provided. The electronic device includes an external image-capturing module, a receiving recess and a restriction unit. The external image-capturing module is adapted to be received in the receiving recess. The restriction unit is moveable between a first position and a second position, and when the restriction unit is in the first position, the restriction unit abuts the external image-capturing module and restricts the movement of the external image-capturing module, and when the restriction unit is in the second position, the external image-capturing module is released by the restriction unit.

6 Claims, 14 Drawing Sheets

ELECTRONIC DEVICE WITH EXTERNAL IMAGE-CAPTURING MODULE

CROSS REFERENCE TO RELATED APPLICATIONS

This Application claims priority of Taiwan Patent Application No. 108103975, filed on Feb. 1, 2019, the entirety of which is incorporated by reference herein.

BACKGROUND OF THE INVENTION

Field of the Invention

The present invention relates to an electronic device, and in particular to an electronic device with an external image-capturing module.

Description of the Related Art

Conventionally, an image-capturing module is affixed to the top of the display of a notebook computer to capture images. The image-capturing module occupies the inner space of the cover, and the ratio of the display to the notebook cover is decreased. Additionally, the image-capturing module is uncovered when the user uses the notebook, and hackers can steal images of the user without being noticed.

BRIEF SUMMARY OF THE INVENTION

In one embodiment, an electronic device is provided. The electronic device includes an external image-capturing module, a receiving recess and a restriction unit. The external image-capturing module is adapted to be received in the receiving recess. The restriction unit is moveable between a first position and a second position, and when the restriction unit is in the first position, the restriction unit abuts the external image-capturing module and restricts the movement of the external image-capturing module, and when the restriction unit is in the second position, the external image-capturing module is released by the restriction unit.

In one embodiment, the restriction unit comprises a latch, wherein the latch comprises at least one latch-wedging portion, the external image-capturing module comprises at least one module-wedging portion, and when the restriction unit is in the first position, the latch-wedging portion is connected to the module-wedging portion, and when the restriction unit is in the second position, the latch-wedging portion releases the module-wedging portion.

In one embodiment, the receiving recess comprises at least one recess through hole, and the module-wedging portion passes through the recess through hole and is adapted to be connected to the latch-wedging portion.

In one embodiment, the electronic device further comprises a device housing, wherein the receiving recess is connected to the device housing, the restriction unit further comprises a button, the latch comprises a button connection portion, the device housing comprises a housing opening and a housing through hole, the receiving recess corresponds to the housing opening, and the button passes through the housing through hole to be connected to the button connection portion.

In one embodiment, the latch comprises a latch inclined surface, and when the restriction unit is moved from the second position to a third position, the latch inclined surface pushes the module-wedging portion to move the external image-capturing module, and the latch inclined surface is connected to the latch-wedging portion.

In one embodiment, the restriction unit further comprises a recovery elastic element, the latch comprises a latch abutting wall and a guiding post, the guiding post is connected to the latch abutting wall, the receiving recess comprises a recess abutting wall, a wall through hole is formed on the recess abutting wall, the guiding post is adapted to pass through the wall through hole, the recovery elastic element is telescoped on the guiding post, one end of the recovery elastic element abuts the latch abutting wall, and the other end of the recovery elastic element abuts the recess abutting wall.

In one embodiment, the electronic device further comprises a pushing elastic element, wherein the pushing elastic element is disposed in the receiving recess, and when the restriction unit is in the second position, the restriction unit releases the external image-capturing module, and the pushing elastic element provides an elastic force to push the external image-capturing module.

In one embodiment, the receiving recess comprises a plurality of recess hooks, the latch comprises a plurality of guiding ribs, and the guiding ribs abut the recess hooks and slide relative to the recess hooks.

In one embodiment, the electronic device further comprises a device body and a cover. The device body comprises an input interface. The cover pivots on the device body, wherein the cover comprises a display, and the receiving recess is located between the input interface and the display.

In one embodiment, the external image-capturing module comprises at least one module positioning post, a module connection port and a module positioning magnet, the cover comprises at least one cover positioning slot, a cover connection port and a cover positioning magnet, and when the external image-capturing module is connected to the cover, the module connection port couples the cover connection port, the module positioning post is inserted into the cover positioning slot, and the module positioning magnet corresponds to the cover positioning magnet.

Utilizing the electronic device of the embodiment of the invention, the receiving recess is disposed in the electronic device to receive the external image-capturing module. Therefore, the external image-capturing module can be carried with the electronic device. No additional carrying space is required, and the user is prevented from forgetting the external image-capturing module. Additionally, since the receiving recess is disposed in the idle space of the device body or the cover, the size of the electronic device stays the same.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
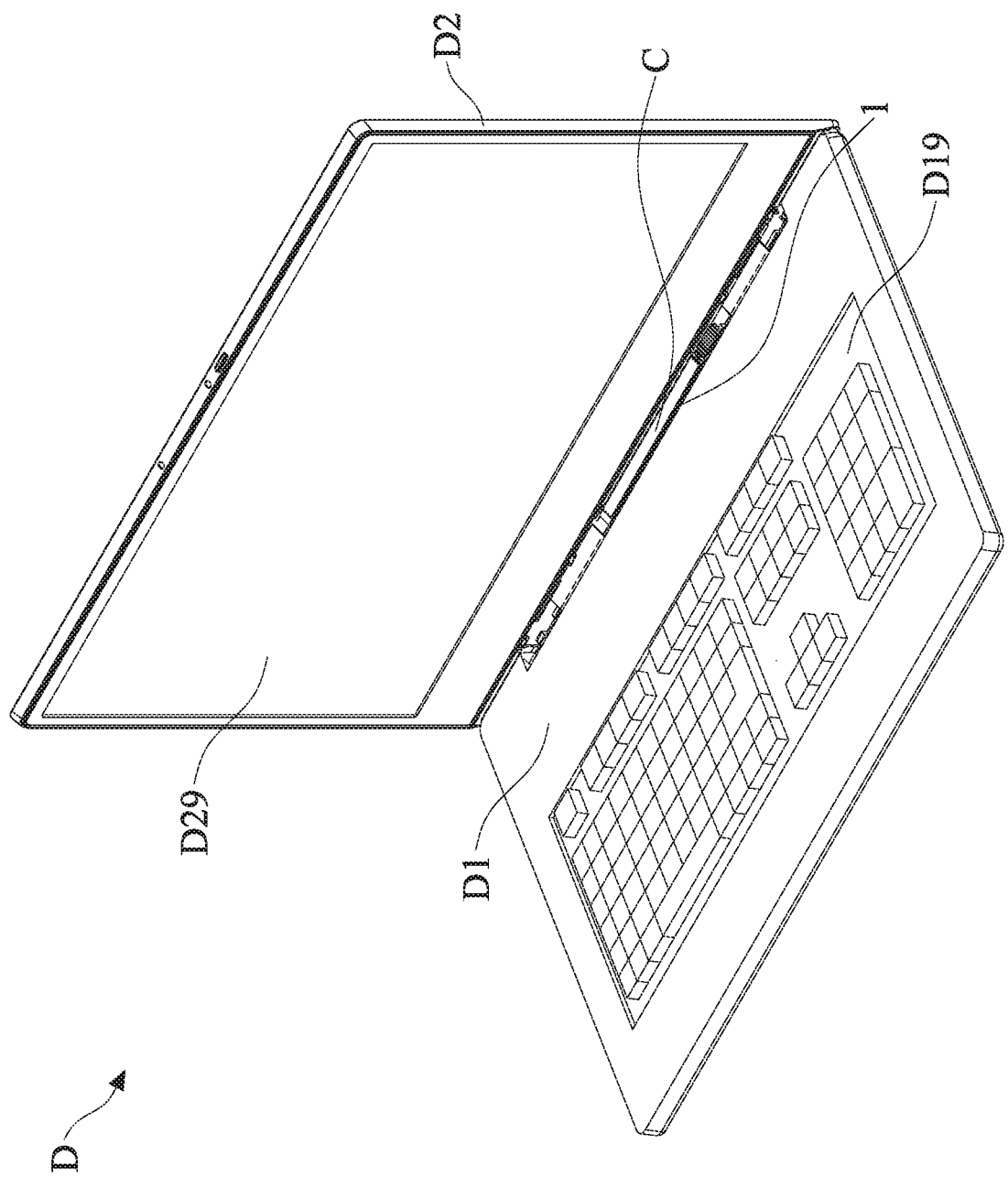
FIG. 1A shows an electronic device of an embodiment of the invention, wherein an external image-capturing module is received in a receiving recess.
Figure 1B:
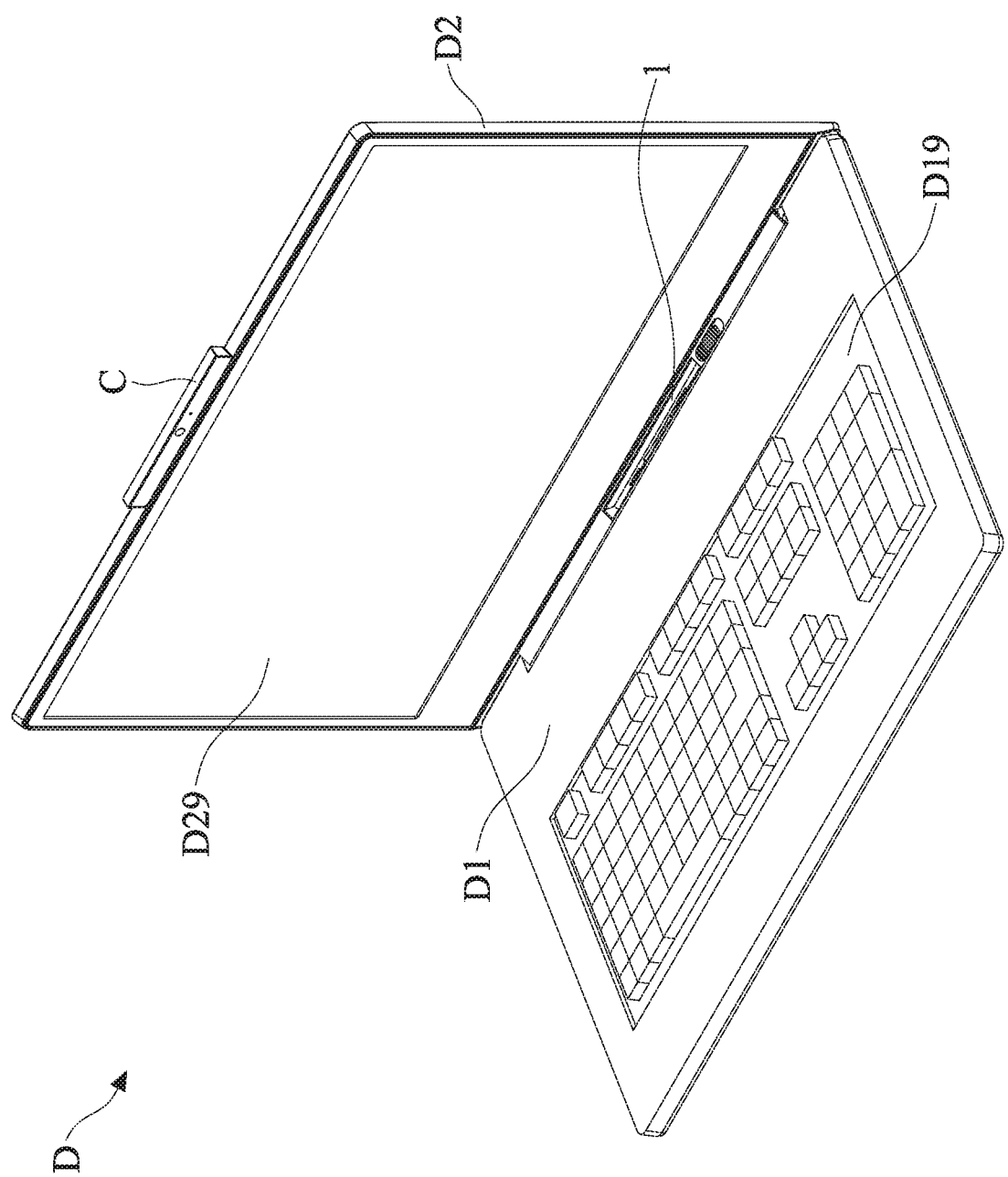
FIG. 1B shows the electronic device of the embodiment of the invention, wherein the external image-capturing module is connected to a cover of the electronic device.

FIGS. 1A and 1B show an electronic device D of an embodiment of the invention. With reference to FIG. 1A, the electronic device D of the embodiment of the invention includes an external image-capturing module C, a receiving recess 1 and a restriction unit (not shown). The external image-capturing module C is adapted to be received in the receiving recess 1 while not used.

Figure 2:
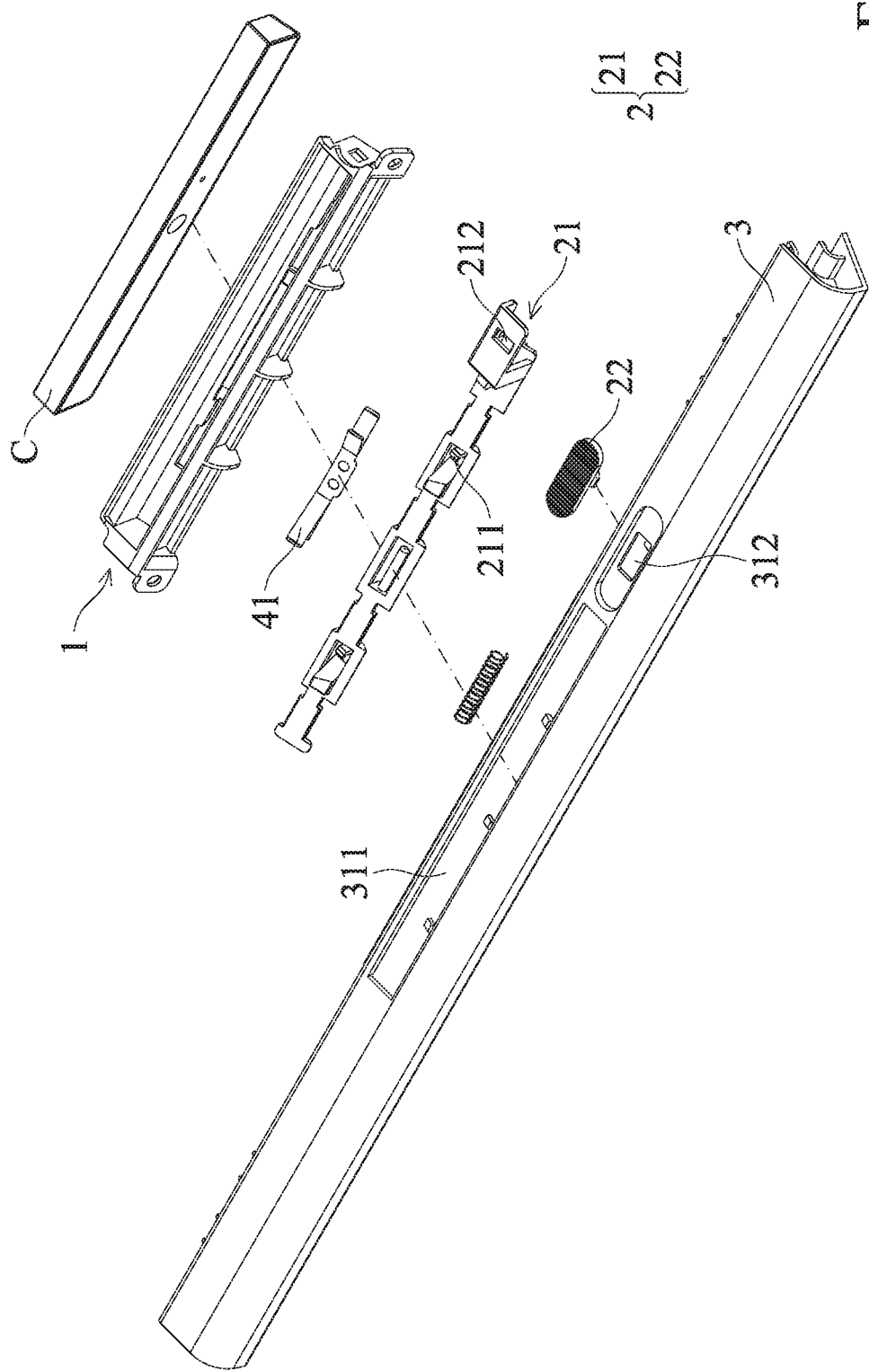
FIG. 2 is an exploded view of a portion of the electronic device of the embodiment of the invention.
Figure 3A:
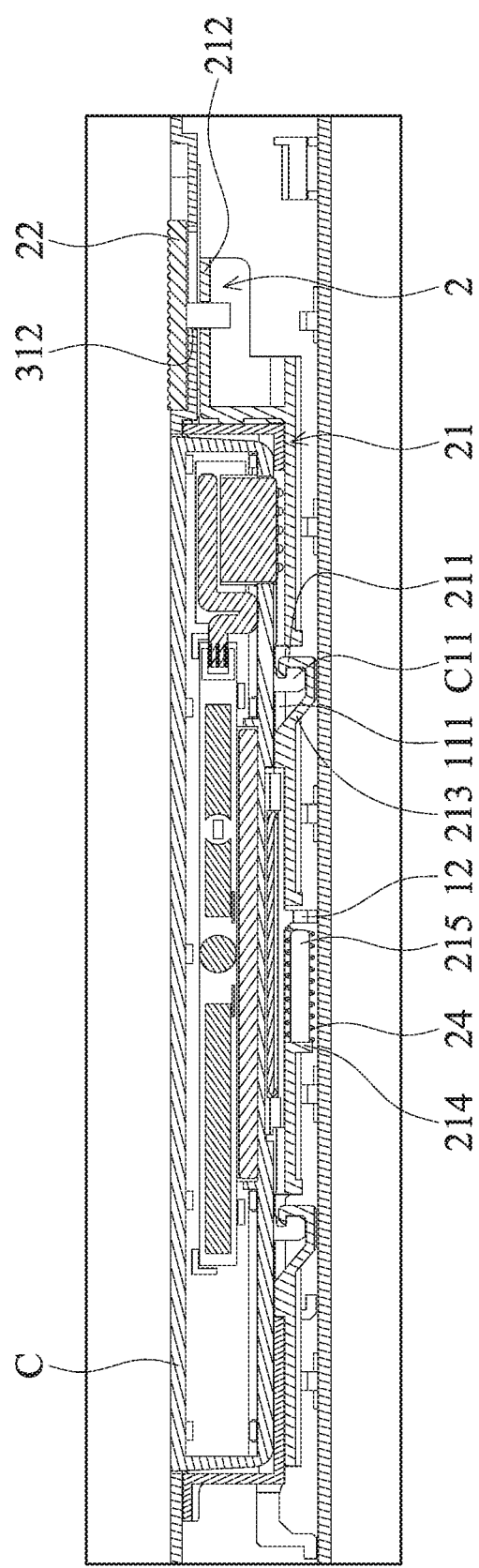
FIG. 3A shows the details of a restriction unit of the embodiment of the invention, wherein the restriction unit is in a first position.
Figure 3B:
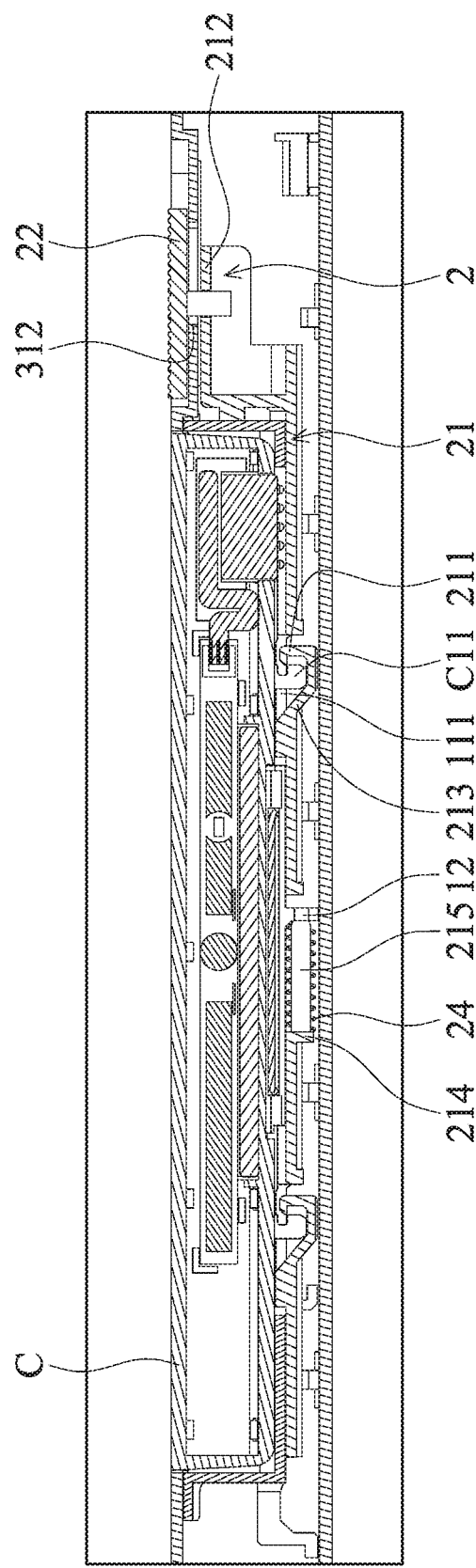
FIG. 3B shows the details of a restriction unit of the embodiment of the invention, wherein the restriction unit is in a second position.

FIG. 2 is an exploded view of a portion of the electronic device D of the embodiment of the invention. FIGS. 3A and 3B show the details of the restriction unit of the embodiment of the invention. With reference to FIGS. 2, 3A and 3B, the restriction unit 2 is moveable between a first position (FIG. 3A) and a second position (FIG. 3B). When the restriction unit 2 is in the first position (FIG. 3A), the restriction unit 2 abuts the external image-capturing module C and restricts the movement of the external image-capturing module C. When the restriction unit 2 is in the second position (FIG. 3B), the external image-capturing module C is released by the restriction unit 2.

With reference to FIGS. 2, 3A and 3B, in one embodiment, the electronic device D further comprises a device housing 3, wherein the receiving recess 1 is connected to the device housing 3.

Figure 4A:
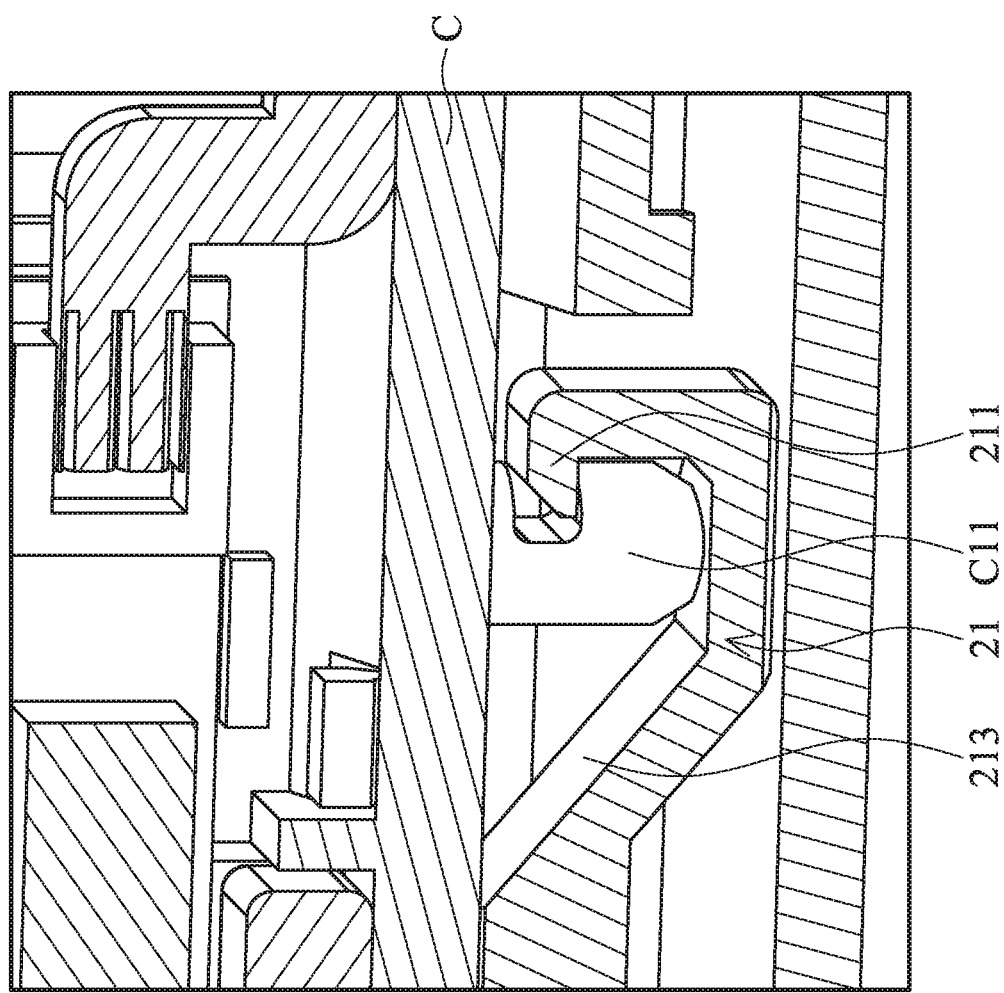
FIG. 4A shows the details of a latch-wedging portion and a module-wedging portion of the embodiment of the invention, wherein the restriction unit is in the first position.
Figure 4B:
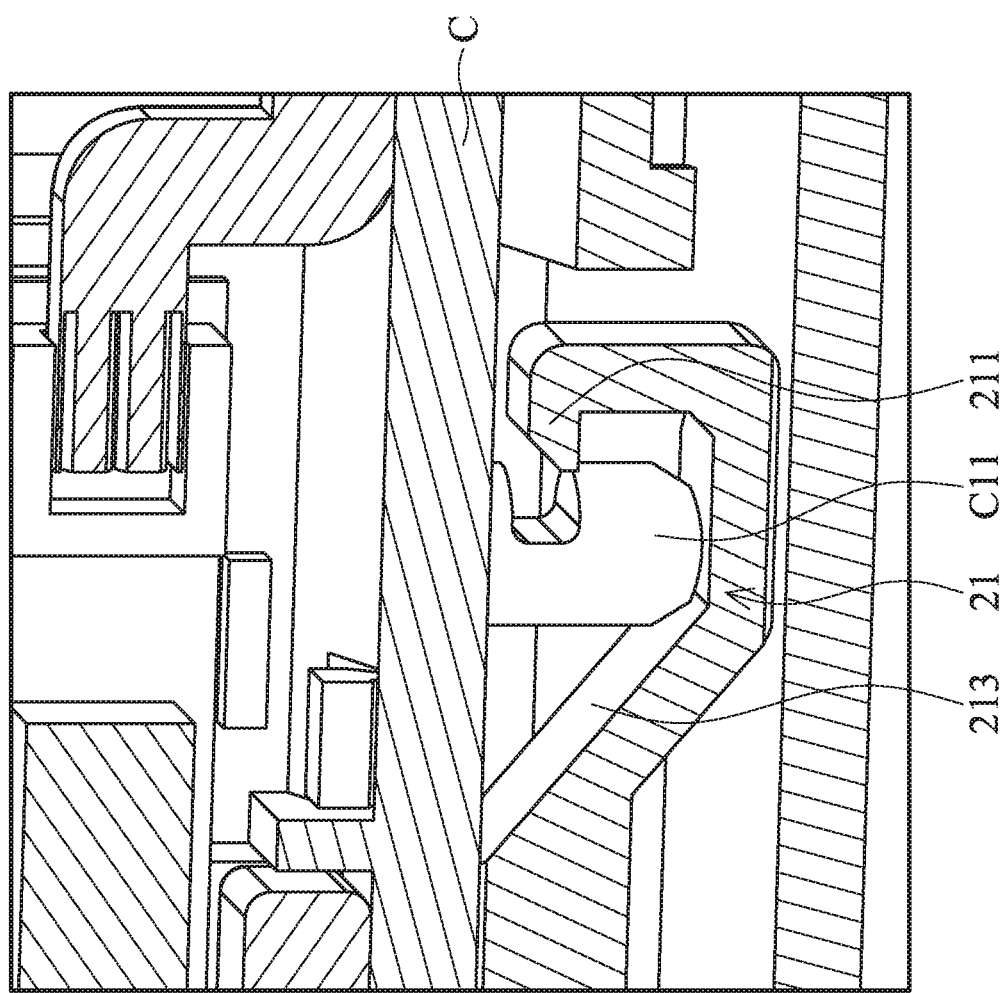
FIG. 4B shows the details of a latch-wedging portion and a module-wedging portion of the embodiment of the invention, wherein the restriction unit is in the second position.
Figure 4C:
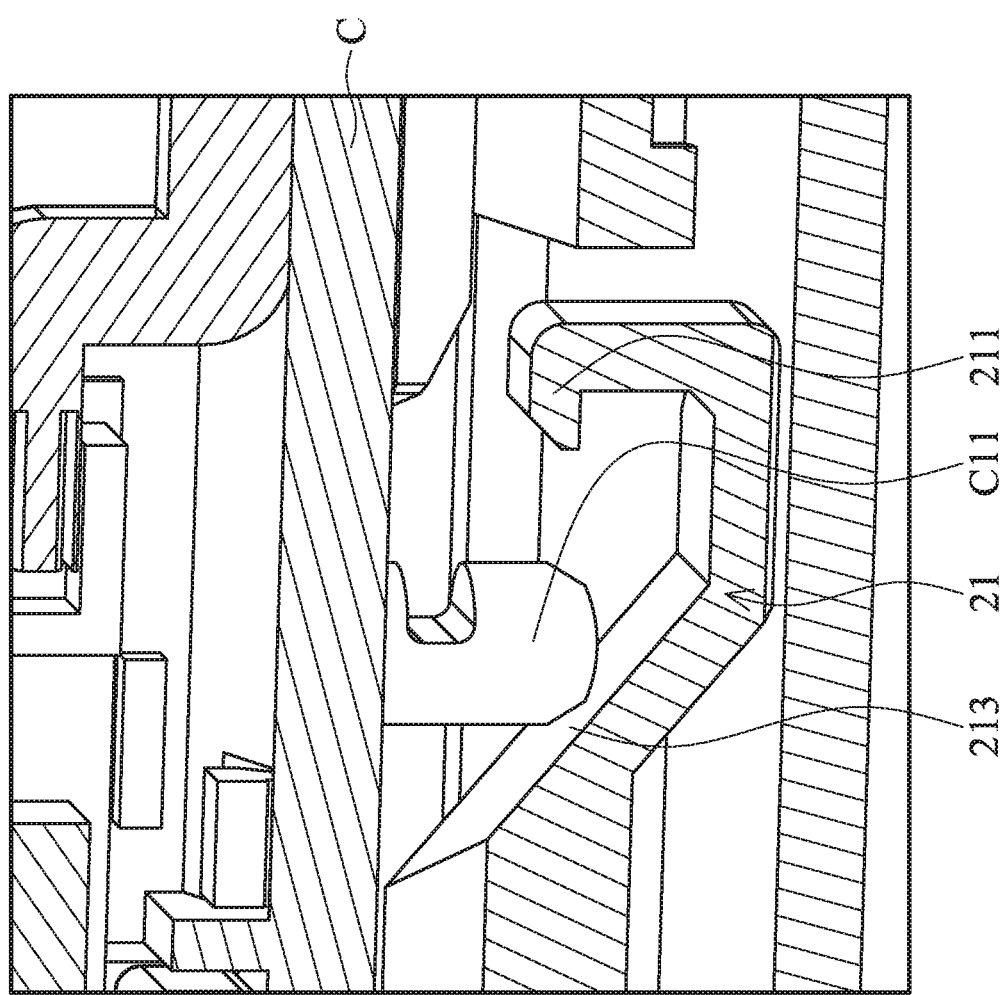
FIG. 4C shows the details of a latch-wedging portion and a module-wedging portion of the embodiment of the invention, wherein the restriction unit is in a third position.

With reference to FIGS. 4A, 4B and 4C, in one embodiment, the restriction unit 2 comprises a latch 21. The latch 21 comprises at least one latch-wedging portion 211. The external image-capturing module C comprises at least one module-wedging portion C11. When the restriction unit 2 is in the first position (FIG. 4A), the latch-wedging portion 211 is connected to the module-wedging portion C11. When the restriction unit 2 is in the second position (FIG. 4B), the latch-wedging portion 211 releases the module-wedging portion C11.

In this embodiment, the latch-wedging portion 211 is a hook. The module-wedging portion C11 is also a hook. The disclosure is not meant to restrict the invention. In another embodiment, the latch-wedging portion 211 and the module-wedging portion C11 can be connected in other detachable ways.

Figure 3C:
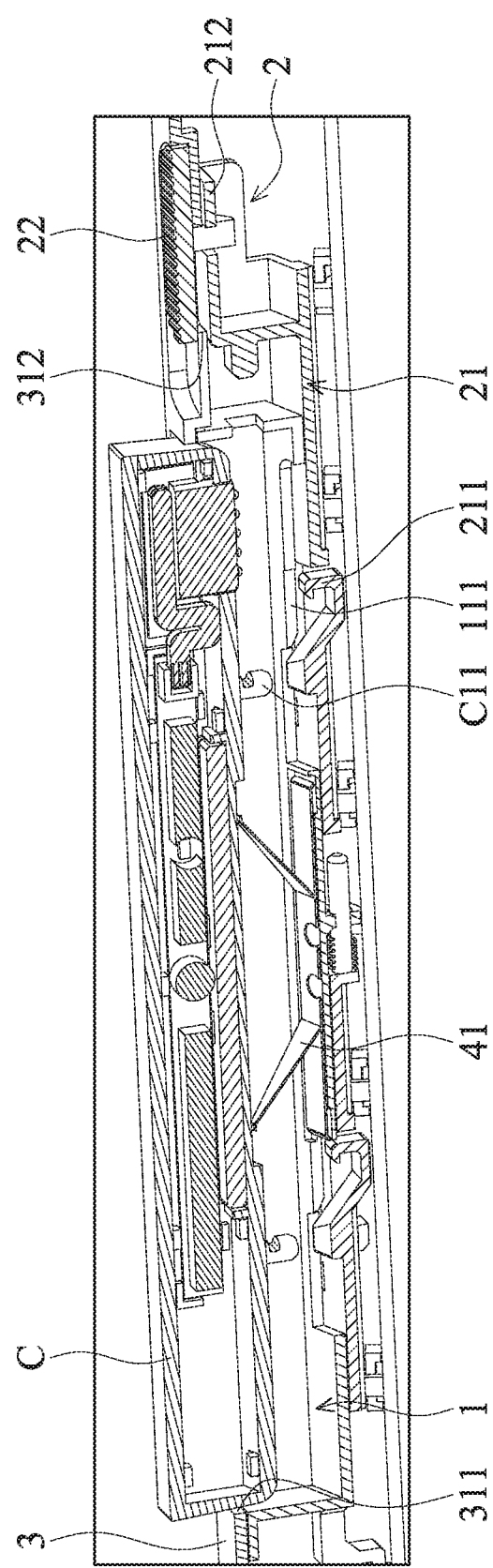
FIG. 3C shows the details of a recess through hole of the embodiment of the invention.

With reference to FIG. 3C, in one embodiment, the receiving recess 1 comprises at least one recess through hole 111. The module-wedging portion C11 passes through the recess through hole 111 and is adapted to be connected to the latch-wedging portion 211. In this embodiment, at least a portion of the receiving recess 1 is located between the external image-capturing module C and the latch 21.

With reference to FIGS. 2, 3A and 3B, in one embodiment, the restriction unit 2 further comprises a button 22. The latch 21 comprises a button connection portion 212. The device housing 3 comprises a housing opening 311 and a housing through hole 312. The receiving recess 1 corresponds to the housing opening 311. The button 22 passes through the housing through hole 312 to be connected to the button connection portion 212.

With reference to FIGS. 4A, 4B and 4C, in one embodiment, the latch 21 comprises a latch inclined surface 213. When the restriction unit 2 is moved from the second position (FIG. 4B) to a third position (FIG. 4C), the latch inclined surface 213 pushes the module-wedging portion C11 to move the external image-capturing module C. The latch inclined surface 213 is connected to the latch-wedging portion 211. In this embodiment, when the restriction unit 2 is moved from the first position (FIG. 4A) to the second position (FIG. 4B), the restriction unit 2 only releases the module-wedging portion C11. When the restriction unit 2 is moved from the second position (FIG. 4B) to the third position (FIG. 4C), the latch inclined surface 213 pushes the module-wedging portion C11 to move the external image-capturing module C partially out of the receiving recess 1.

Figure 5:
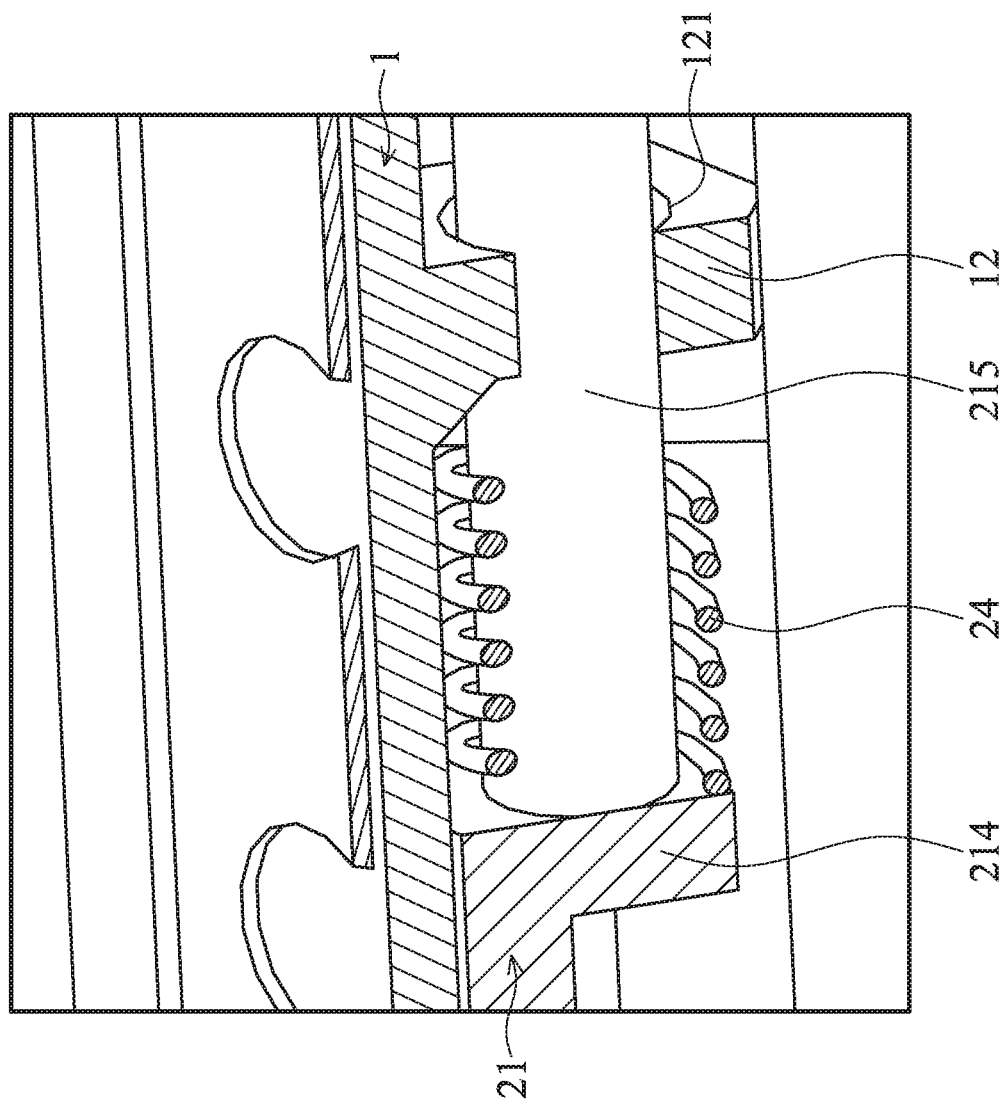
FIG. 5 shows an recovery elastic element of the embodiment of the invention.

With reference to FIG. 5, in one embodiment, the restriction unit 2 further comprises a recovery elastic element 24. The latch 21 comprises a latch abutting wall 214 and a guiding post 215. The guiding post 215 is connected to the latch abutting wall 214. The receiving recess 1 comprises a recess abutting wall 12. A wall through hole 121 is formed on the recess abutting wall 12. The guiding post 215 is adapted to pass through the wall through hole 121. The recovery elastic element 24 is telescoped on the guiding post 215. One end of the recovery elastic element 24 abuts the latch abutting wall 214, and the other end of the recovery elastic element 24 abuts the recess abutting wall 12.

With reference to FIGS. 3A, 3B and 5, in this embodiment, the recovery elastic element 24 can be a compression spring. The recovery elastic element 24 provides an elastic force to make the restriction unit 2 tend to return to the first position. The disclosure is not meant to restrict the invention. For example, in other embodiments, the recovery elastic element 24 can be a tension spring or other elastic elements.

With reference to FIGS. 2 and 3C, in one embodiment, the electronic device optionally further comprises a pushing elastic element 41. The pushing elastic element 41 is disposed in the receiving recess 1. When the restriction unit 2 is in the second position, the restriction unit 2 releases the external image-capturing module C, and the pushing elastic element 41 provides an elastic force to push the external image-capturing module C out of the receiving recess 1.

In one embodiment, the latch inclined surface 213 pushes the module-wedging portion C11 to move the external image-capturing module C partially out of the receiving recess 1, and the pushing elastic element 41 therefore can be omitted. In another embodiment, since the pushing elastic element 41 can push the external image-capturing module C out of the receiving recess 1, the latch inclined surface 213 can be omitted. The disclosure is not meant to restrict the invention. In different embodiments, the external image-capturing module C can be picked up from the receiving recess 1 in different ways.

Figure 6:
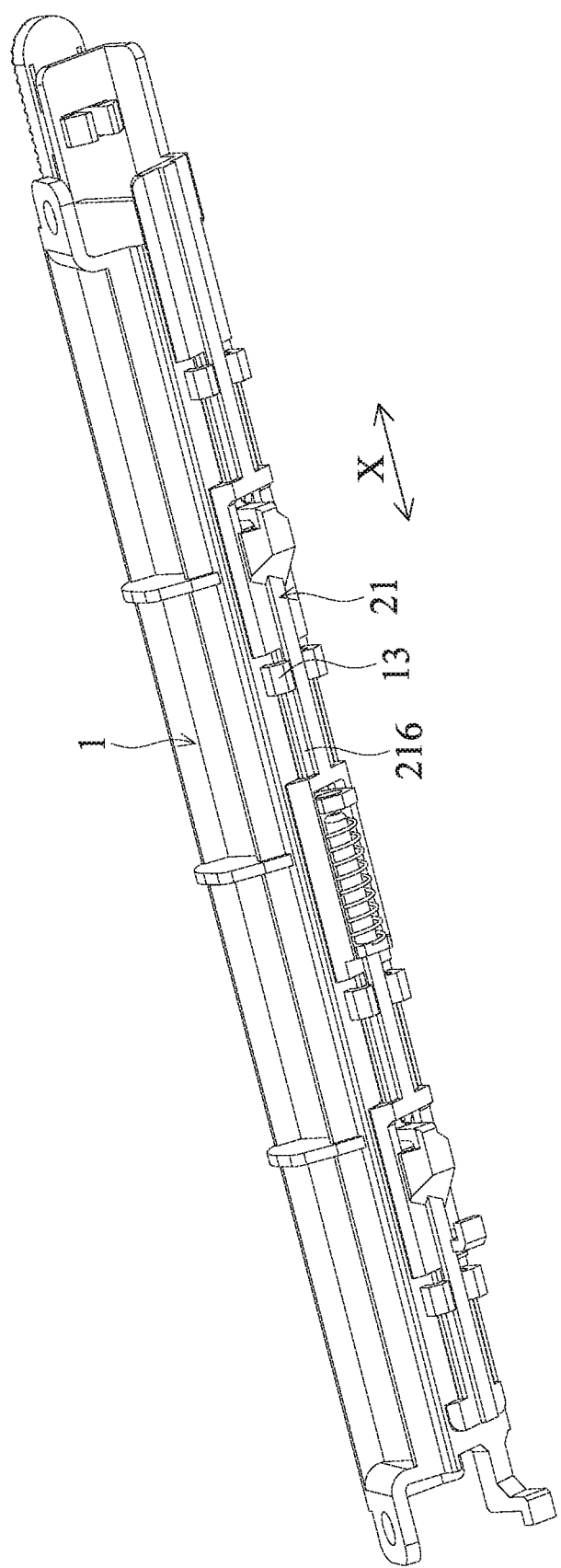
FIG. 6 shows recess hooks and guiding ribs of the embodiment of the invention.

With reference to FIG. 6, in one embodiment, the receiving recess 1 comprises a plurality of recess hooks 13. The latch 21 comprises a plurality of guiding ribs 216. The guiding ribs 216 abut the recess hooks 13 and slide relative to the recess hooks 13. The recess hooks 13 restrict the latch 21 to be moved between the first position, the second position and the third position in a displacement direction X.

With reference to FIGS. 1A and 1B, in one embodiment, the electronic device D further comprises a device body D1 and a cover D2. The device body D1 comprises an input interface D19. The cover D2 pivots on the device body D1. The cover D2 comprises a display D29. The receiving recess 1 is located between the input interface D19 and the display D29. With reference to FIG. 1B, the external image-capturing module C is adapted to be connected to the cover D2 to capture images.

Figure 7A:
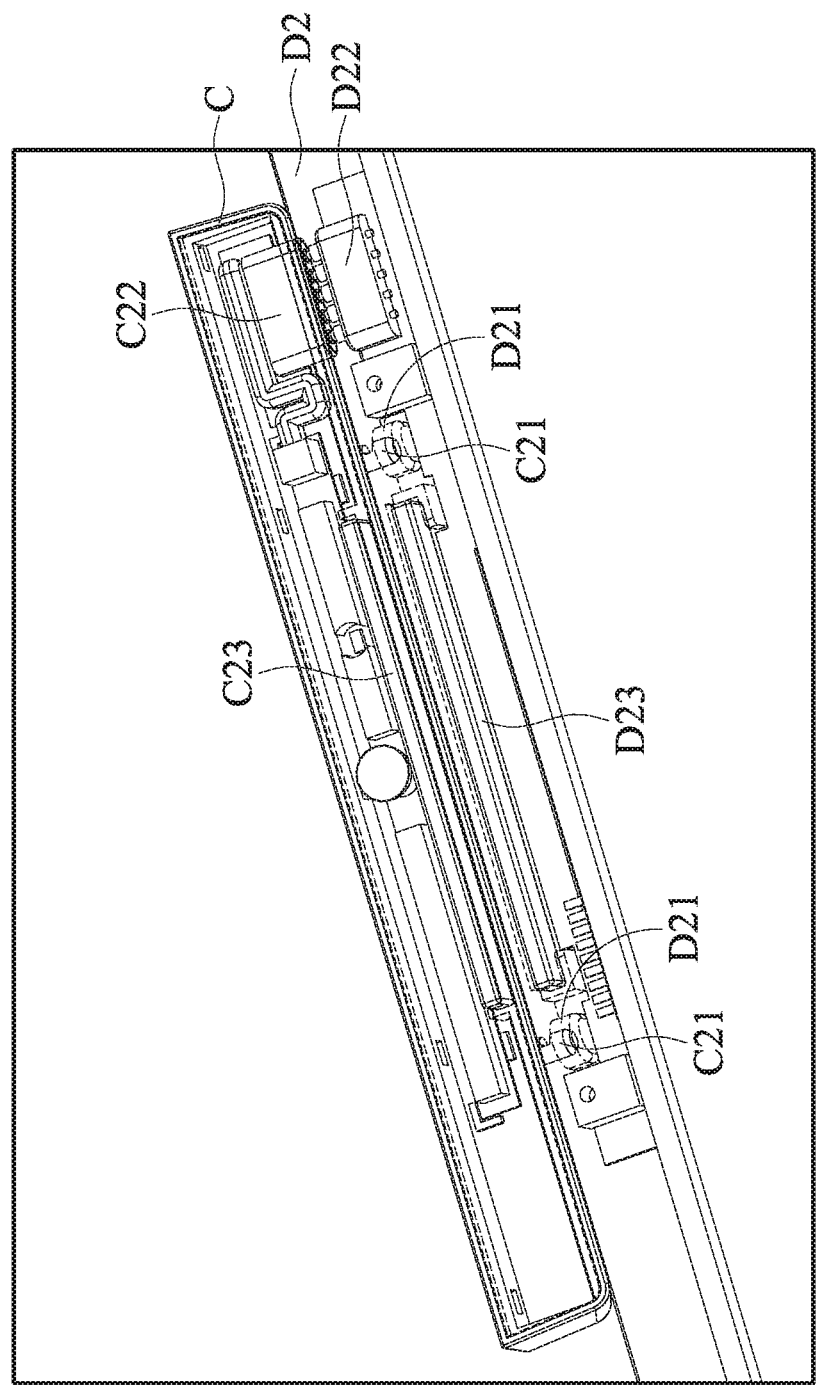
FIG. 7A shows the details of the external image-capturing module connected to the cover of the electronic device.
Figure 7B:
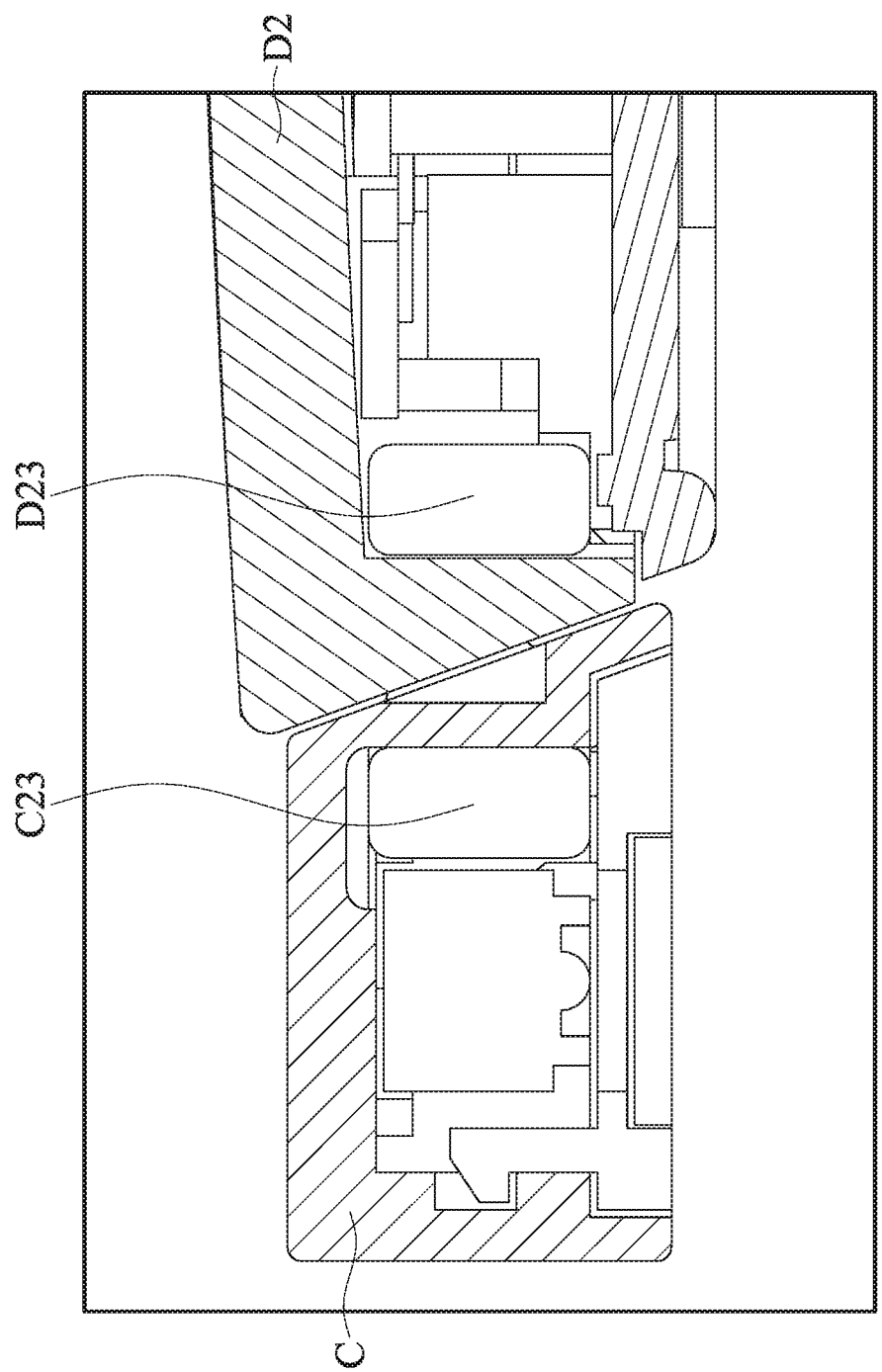
FIG. 7B shows a module position magnet corresponding to a cover positioning magnet of the embodiment of the invention.
Figure 7C:
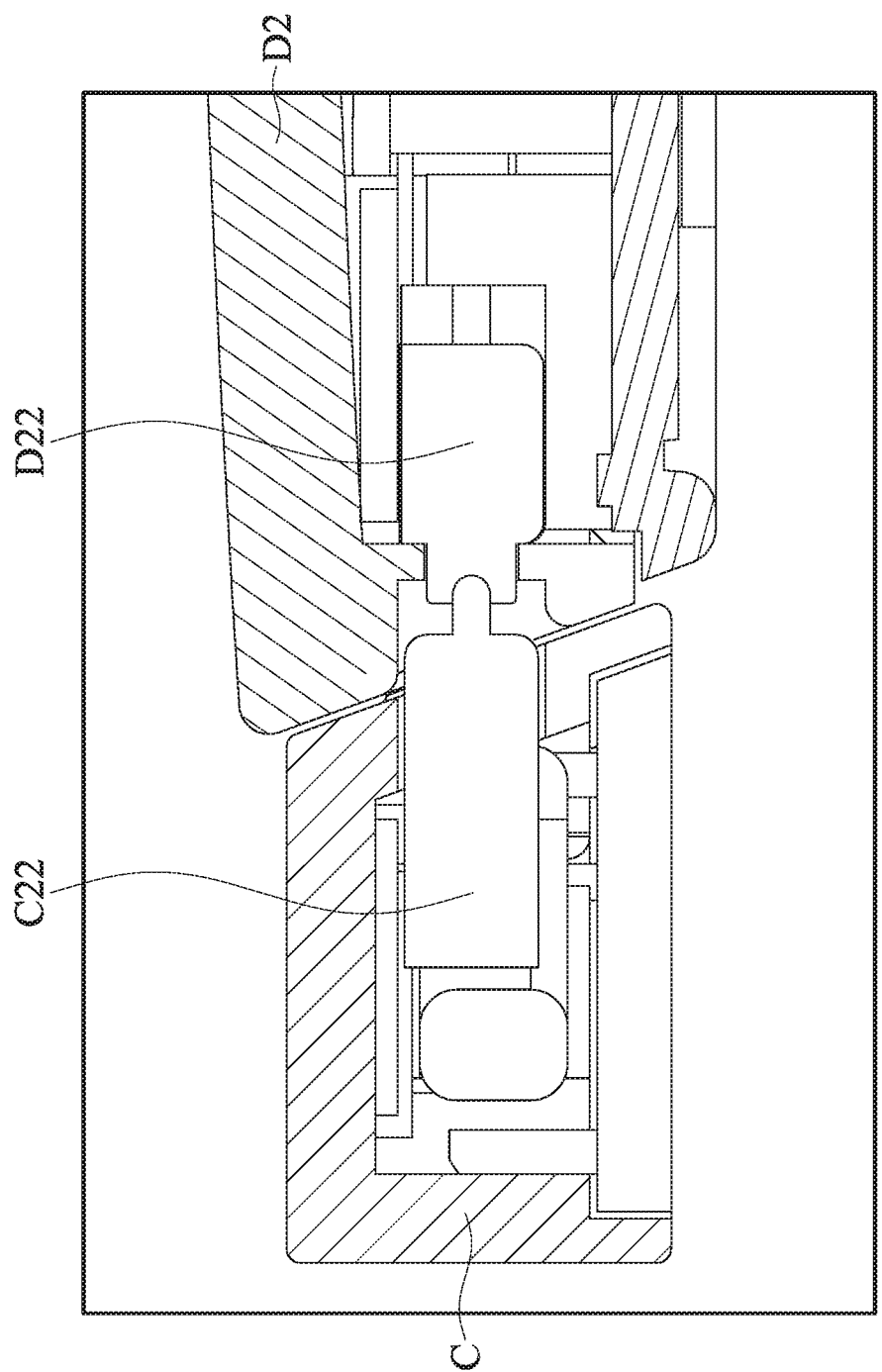
FIG. 7C shows a module connection port being coupled to a cover connection port of the embodiment of the invention.

With reference to FIGS. 7A, 7B and 7C, in one embodiment, the external image-capturing module C comprises at least one module positioning post C21, a module connection port C22 and a module positioning magnet C23. The cover D2 comprises at least one cover positioning slot D21, a cover connection port D22 and a cover positioning magnet D23. When the external image-capturing module C is connected to the cover D2, the module connection port C22 couples the cover connection port D22, the module positioning post C21 is inserted into the cover positioning slot D21, and the module positioning magnet C23 corresponds to the cover positioning magnet D23. The position of the external image-capturing module C relative to the cover D2 can be fastened by inserting the positioning post C21 into the cover positioning slot D21. The signals and the electricity can be transmitted between the external image-capturing module C and the electronic device D by coupling the module connection port C22 to the cover connection port D22. Additionally, the position of the external image-capturing module C relative to the cover D2 can be positioned by corresponding the module positioning magnet C23 to the cover positioning magnet D23.

In one embodiment, the module connection port C22 can include pogo pins. The disclosure is not meant to restrict the invention. The module connection port C22 can also be a connector of other type.

In one embodiment, the electronic device D is a laptop computer. However, the disclosure is not meant to restrict the invention. The electronic device D can be other devices utilizing the external image-capturing module C.

In one embodiment, the receiving recess 1 can be disposed in the device body D1 or the cover D2. In other words, the device housing 3 can be a portion of the device body D1 or the cover D2. The disclosure is not meant to restrict the invention.

Utilizing the electronic device D of the embodiment of the invention, the receiving recess 1 is disposed in the electronic device D to receive the external image-capturing module C. Therefore, the external image-capturing module C can be carried with the electronic device D. No additional carrying space is required, and the user is prevented from forgetting the external image-capturing module C. Additionally, since the receiving recess 1 is disposed in the idle space of the device body D1 or the cover D2, and the size of the electronic device D stays the same.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising: an external image-capturing module comprises at least one module-wedging portion; a receiving recess, wherein in a receiving mode, the external image-capturing module is adapted to be received in the receiving recess; and a restriction unit comprises a latch with at least one latch-wedging portion extended from a latch inclined surface, wherein the restriction unit is moveable by a button between a first position and a second position in a first direction, and when the restriction unit is in the first position, the latch-wedging portion is hooked to the module-wedging portion, and when the restriction unit is moved from the first position to the second position, the latch-wedging portion releases the module-wedging portion and the latch inclined surface pushes the module-wedging portion to move the external image-capturing module out of the receiving recess in a second direction perpendicular to the first direction.

2. The electronic device as claimed in claim 1, wherein the restriction unit further comprises a recovery elastic element, the latch comprises a latch abutting wall and a guiding post, the guiding post is connected to the latch abutting wall, the receiving recess comprises a recess abutting wall, a wall through hole is formed on the recess abutting wall, the guiding post is adapted to pass through the wall through hole, the recovery elastic element is telescoped on the guiding post, one end of the recovery elastic element abuts the latch abutting wall, and the other end of the recovery elastic element abuts the recess abutting wall.

3. The electronic device as claimed in claim 1, further comprising a pushing elastic element, wherein the pushing elastic element is disposed in the receiving recess, and when the restriction unit is in the second position, the restriction unit releases the external image-capturing module, and the pushing elastic element provides an elastic force to push the external image-capturing module.

4. The electronic device as claimed in claim 1, wherein the receiving recess comprises a plurality of recess hooks, the latch comprises a plurality of guiding ribs, and the guiding ribs abut the recess hooks and slide relative to the recess hooks.

5. The electronic device as claimed in claim 1, further comprising:

a device body, wherein the device body comprises an input interface;

a cover, pivoting on the device body, wherein the cover comprises a display, and the receiving recess is located between the input interface and the display, wherein in an image capturing mode, the external image-capturing module is out of the receiving recess, and the external image-capturing module is directly connected to the cover.

6. The electronic device as claimed in claim 5, wherein the external image-capturing module comprises at least one module positioning post, a module connection port and a module positioning magnet, the cover comprises at least one cover positioning slot, a cover connection port and a cover positioning magnet, and when the external image-capturing module is connected to the cover, the module connection port couples the cover connection port, the module positioning post is inserted into the cover positioning slot, and the module positioning magnet corresponds to the cover positioning magnet.

\* \* \* \* \*